No. 677,992. Patented July 9, 1901.
A. J. JOHNSON.
APPARATUS FOR BLUESTONING SEED.
(Application filed Apr. 22, 1901.)
(No Model.) 2 Sheets—Sheet 1.
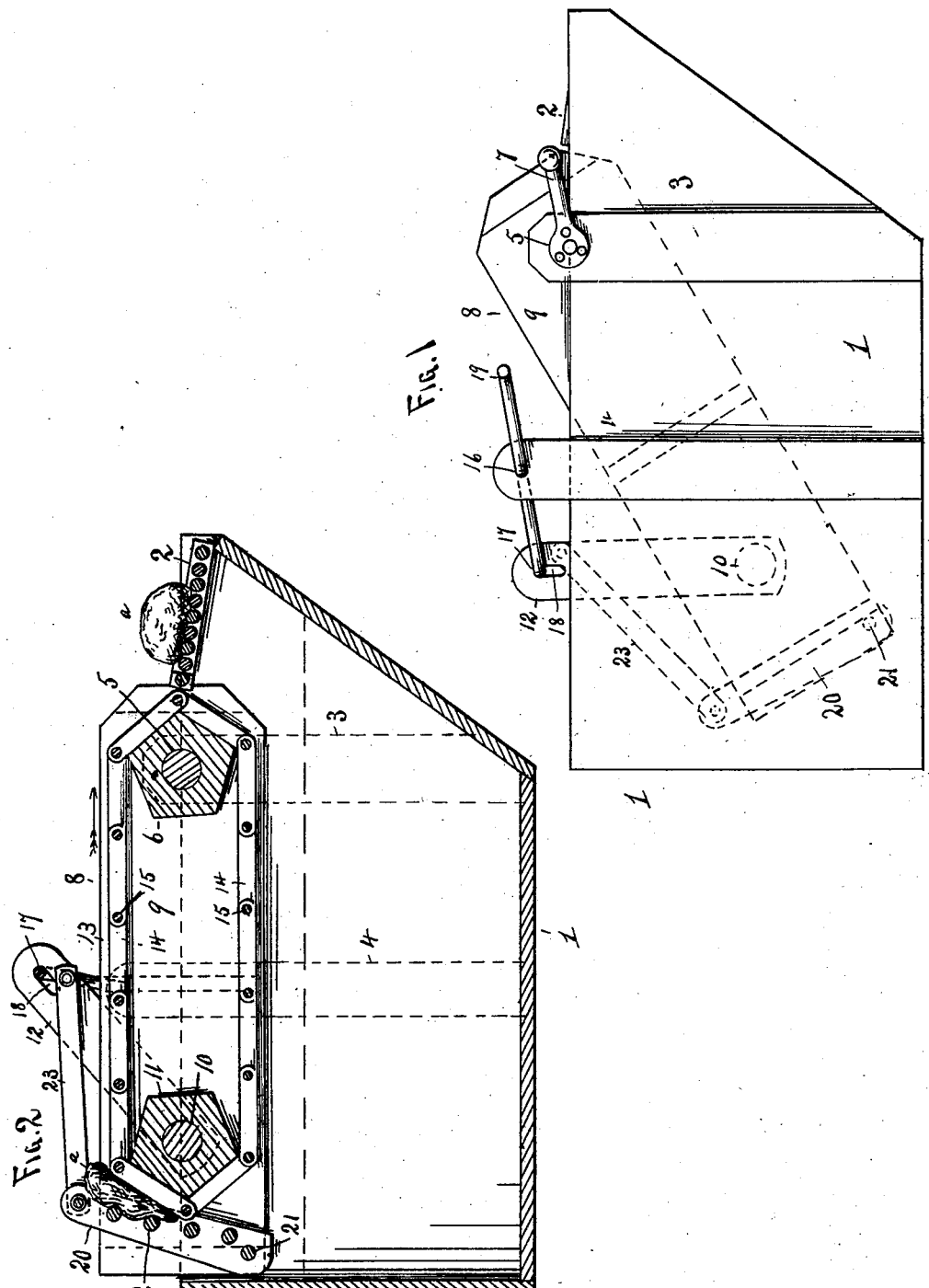
Witnesses
C. N. Woodward
J. W. Garner
A. J. Johnson, Inventor
By C. A. Snow & Co.
Attorneys
THE NORRIS PETERS CO., PHOTO-LITHO., WASHINGTON, D. C.

No. 677,992. Patented July 9, 1901.
A. J. JOHNSON.
APPARATUS FOR BLUESTONING SEED.
(Application filed Apr. 22, 1901.)
(No Model.) 2 Sheets—Sheet 2.
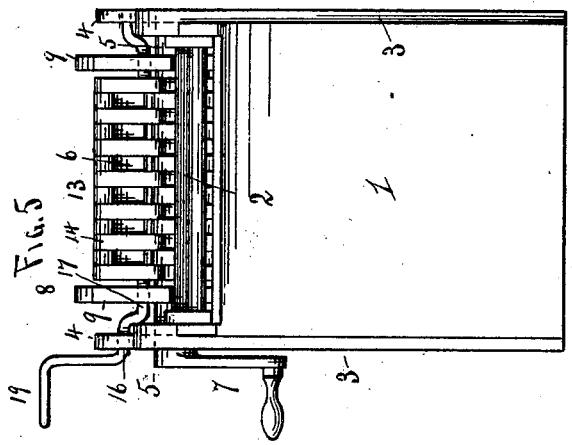
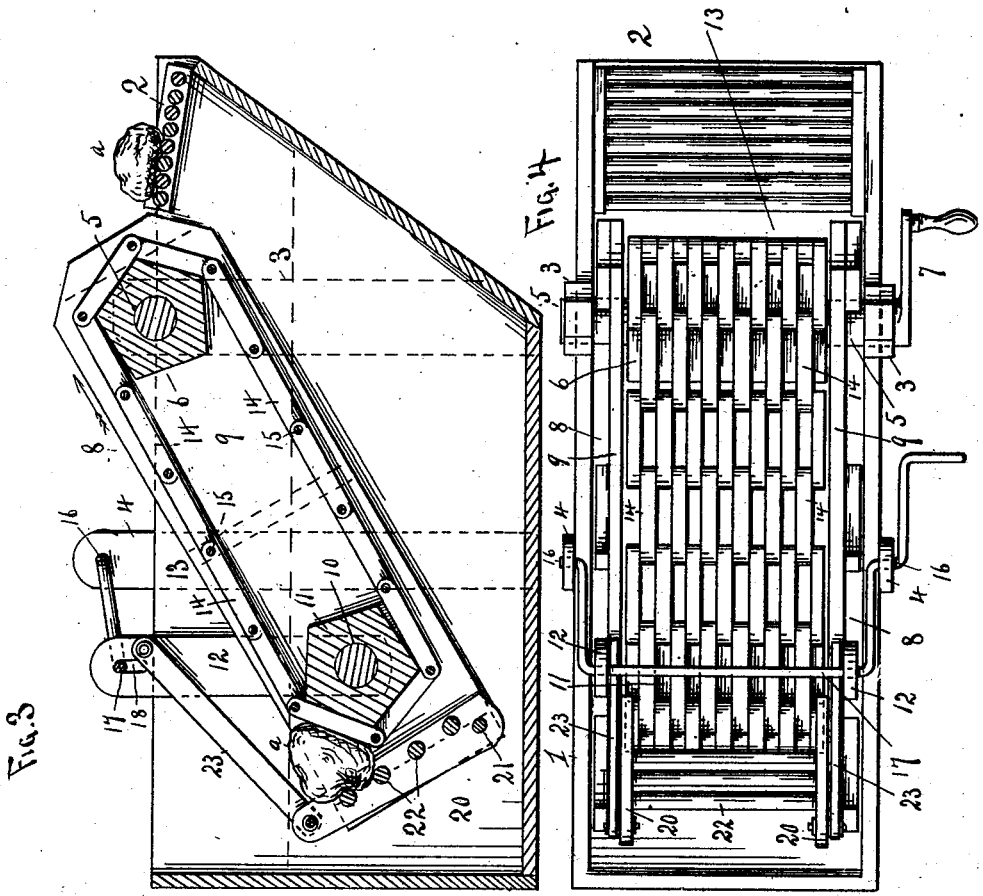
Witnesses
A. J. Johnson, Inventor

UNITED STATES PATENT OFFICE.

ANDREW J. JOHNSON, OF ARBUCKLE, CALIFORNIA.

APPARATUS FOR BLUESTONING SEED.

SPECIFICATION forming part of Letters Patent No. 677,992, dated July 9, 1901.

Application filed April 22, 1901. Serial No. 56,954. (No model.)

*To all whom it may concern:*

Be it known that I, ANDREW J. JOHNSON, a citizen of the United States, residing at Arbuckle, in the county of Colusa and State of California, have invented a new and useful Apparatus for Bluestoning Wheat, of which the following is a specification.

My invention is an improved apparatus for bluestoning seed-wheat; and it consists in the peculiar construction and combination of devices hereinafter fully set forth and claimed.

In the accompanying drawings, Figure 1 is a side elevation of an apparatus constructed in accordance with my invention. Fig. 2 is a vertical sectional view of the same, showing the conveyer raised to a horizontal position. Fig. 3 is a similar view of the same, showing the conveyer lowered. Fig. 4 is a top plan view of the same. Fig. 5 is an end elevation of the same.

In the embodiment of my invention I provide a tank 1, which may be either of the form here shown or of any other suitable form and is of suitable dimensions. The said tank is adapted to contain a solution of bluestone or any other suitable liquid for treating seed-wheat. Over one end of the said tank is a draining-frame 2, which may be either of the construction here shown or any other suitable construction. On the sides of said tank 1, at a suitable distance from one end thereof, which I will term the "front" end, are a pair of vertical standards 3, the upper ends of which extend above the sides of the tank. Also on the sides of the tank, at a suitable distance from the standards 3, are a pair of standards 4, which are somewhat higher than the standards 3. A shaft 5 is journaled in suitable bearings, with which the upper portions of the standards 3 are provided, and at the central portion of the said shafts is a roller 6 of polygonal form in cross-section. To one end of said shaft is attached a crank 7, by means of which said shaft and said polygonal roller may be rotated. A frame 8, which in the form of my invention here shown comprises a pair of longitudinal side boards 9, is pivotally attached at one end to said shaft 5, the latter at the points intermediate of the ends of roller 6 and the sides of the tank passing through openings in the said side boards 9. Thereby the rear end of said frame 8 may be raised and lowered, so that said frame may be disposed in a horizontal position above the level of the liquid in the tank, as shown in Fig. 2, or inclined so that the rear end of said frame will be submerged in the said liquid, as shown in Fig. 3. A shaft 10 is journaled in bearings near the rear ends of said side boards 9, said shaft having its ends projecting somewhat beyond said side boards, and to the central portion of said shaft is secured a roller 11 of polygonal form in cross-section which corresponds in shape and dimensions with the roller 6. Arms 12 have their lower ends pivoted on the projecting ends of shaft 10, said arms being disposed between the sides of the frame 8 and the sides of tank 1. An endless traveling conveyer 13 connects the rollers 6 11. The said endless traveling conveyer comprises links 14, which are pivotally connected together at their ends by pins 15. The said links are of such length as to be adapted to be engaged by the faces of the polygonal rollers and are preferably made of wood.

A shaft 16 is journaled in bearings near the upper ends of the standards 4 and is offset to form a crank 17, which crank passes through vertical slots 18 near the upper ends of the arms 12. Thereby by partly turning said shaft 16 the rear end of the frame 8 and endless traveling conveyer 13 may be raised and lowered. Said shaft 16 has a crank 19, by means of which it may be thus turned.

A frame 20 is disposed between the side boards 9 of frame 8 at a point in rear of the endless traveling conveyer, but proximate thereto, and said frame is pivotally connected at its lower side to said side boards 9, as at 21. Said frame 20 is provided with a series of rollers 22, which are revoluble in the sides of said frame. Said frame and said rollers constitute a retaining and engaging element, as presently appears. The upper sides of said frame 20 are connected to the arms 12 by links 23. Hence when the shaft 16 is turned to lower the rear end of the frame 8 and the endless traveling conveyers in the solution in the tank the frame 20 is moved rearward from the rear portion of said endless traveling conveyer, as is shown in Fig. 3. When said shaft 16 is turned in such manner as to raise frame 8 and the endless traveling conveyer to a horizontal position, the upper portion of said frame 20 is moved forward and the same is caused to closely approach the rear end of said endless traveling conveyer, as is shown in Fig. 2.

The operation of my invention is as follows: Initially the frame 8 and endless traveling conveyer are lowered to the position shown in Fig. 3. A bag of wheat (indicated at *a*) is placed between the endless traveling conveyer and the retaining and engaging element. The bag of wheat is hence partially or entirely submerged in the liquid. The endless traveling conveyer is then caused to operate in the direction indicated by the arrow in Fig. 3, and hence the links thereof by successive engagement with and passing under the lower side of the bag of wheat cause the latter to rotate, and thereby the bag of wheat becomes entirely saturated by the liquid. Continuing to operate the endless traveling conveyer in the same direction, the operator also turns the shaft 16 by means of the crank 19, and thereby causes the frame 8, together with the endless traveling conveyer and the retaining and engaging element, to move upward, and hence lift the bag of wheat from the water in the tank and also cause the said retaining and engaging element to move forward, closely approaching the rear end of the endless traveling conveyer, and in so doing compress the bag of wheat between the rear portion of said endless traveling conveyer and said retaining and engaging element, and thereby cause the said bag of wheat to be engaged by the conveyer and carried forward on the upper lead thereof to the frame 2, onto which the saturated bag of wheat is discharged by the said conveyer, and the said bag is permitted to remain on said frame while draining, as is indicated in Figs. 2 and 3.

Having thus described my invention, I claim—

1. In an apparatus of the class described, the combination of a tank, an endless traveling conveyer, means to raise and lower one end thereof and means coacting with said endless traveling conveyer to rotate a submerged article in said tank, substantially as described.

2. In an apparatus of the class described, the combination of a tank, an endless traveling conveyer, means to raise and lower one end thereof, and a retaining and engaging element, the latter coacting with said endless traveling conveyer to rotate a bag of grain when said conveyer is lowered and to cause said bag of grain to be engaged by said conveyer when the latter is raised, substantially as described.

3. In an apparatus of the class described, the combination of a tank, an endless traveling conveyer therein, a pivoted retaining and engaging element mounted in the frame of said conveyer in rear of the endless traveling element thereof, a revoluble element, connections between the latter and said conveyer to raise and lower the latter, and connections between said revoluble element and said pivoted retaining and engaging element, to move the latter toward the rear of said endless traveling element as the latter is raised, substantially as described.

4. In an apparatus of the class described, the combination of a tank, a draining-frame at one end thereof, an endless traveling conveyer having one end pivotally mounted in said tank, whereby the rear end of said conveyer may be raised and lowered in the tank, a retaining and engaging element mounted in the frame of said conveyer, means to actuate the endless traveling element of the latter and means to raise and lower the rear end of said conveyer, substantially as described.

In testimony that I claim the foregoing as my own I have hereto affixed my signature in the presence of two witnesses.

ANDREW J. JOHNSON.

Witnesses:
J. E. CAIN,
C. B. MORRISON.